US007817724B2

(12) United States Patent
Lee

(10) Patent No.: US 7,817,724 B2
(45) Date of Patent: Oct. 19, 2010

(54) APPARATUS AND METHOD FOR SYNCHRONIZING TRANSPORT PACKET IN GROUND WAVE DIGITAL MULTIMEDIA BROADCASTING

(75) Inventor: Jeong-taek Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1277 days.

(21) Appl. No.: 11/357,184

(22) Filed: Feb. 21, 2006

(65) Prior Publication Data

US 2006/0188026 A1 Aug. 24, 2006

(30) Foreign Application Priority Data

Feb. 21, 2005 (KR) ..................... 10-2005-0014188

(51) Int. Cl.
*H04N 7/12* (2006.01)

(52) U.S. Cl. ................................................ 375/240.28

(58) Field of Classification Search ............ 375/240.25, 375/240.27, 240.28
See application file for complete search history.

(56) References Cited

U.S. PATENT DOCUMENTS 7,593,474 B2 * 9/2009 Jeong et al. ................. 375/265
7,680,108 B2 * 3/2010 Yu et al. ..................... 370/389
2005/0249301 A1 * 11/2005 Jeong et al. ................. 375/265
2006/0052052 A1 * 3/2006 Jung et al. ................. 455/3.01
2007/0168842 A1 * 7/2007 Jeong et al. ................. 714/786
2007/0171941 A1 * 7/2007 Lee et al. .................... 370/485

FOREIGN PATENT DOCUMENTS

KR 2001-0081320 A 8/2001
KR 2002-0002611 A 1/2002

* cited by examiner

*Primary Examiner*—Khanh C Tran
(74) *Attorney, Agent, or Firm*—Sughrue Mion, PLLC

(57) ABSTRACT

An apparatus and method for synchronizing a TS packet of a ground wave DMB. The method for synchronizing a TS packet of a ground wave DMB includes deinterleaving and decoding a demodulated TS packet; converting the decoded TS packet formed in a unit of bit into a TS packet formed in a unit of byte; detecting a synchronization point of time of the TS packet converted in a unit of byte; deinterleaving and decoding TS packets continued after the synchronization point of time; and sensing in real time whether or not the decoded TS packets in a predetermined range among the TS packets continued after the synchronized point of time are changed in synchronization due to the change of starting position of the TS packets. By sensing in real time whether or not the TS packets that are RS decoded by the external decoder are synchronized, when the TS packets are not synchronized, they are resynchronized and output so that a normal decoding operation can be performed.

14 Claims, 4 Drawing Sheets

CONSTRUCTION OF TS PACKET

APPARATUS AND METHOD FOR SYNCHRONIZING TRANSPORT PACKET IN GROUND WAVE DIGITAL MULTIMEDIA BROADCASTING

CROSS-REFERENCE TO RELATED APPLICATIONS

This application claims benefit under 35 U.S.C. §119 from Korean Patent Application No. 2005-14188, filed on Feb. 21, 2005, the entire content of which is incorporated herein by reference.

BACKGROUND OF THE INVENTION

1. Field of the Invention

The present invention relates to an apparatus and method for synchronizing a transport packet in a ground wave digital multimedia broadcast and, more specifically, to an apparatus and method for synchronizing a transport packet in a ground wave digital multimedia broadcast wherein a normal decoding is performed in a receiver of a digital broadcasting system by synchronizing the transport packets in the receiver.

2. Description of the Related Art

Recently, as digital audio apparatus having excellent sound quality, such as compact disc (CD) and digital video disc (DVD) have increased in popularity, user demand for digital broadcasting with high quality sound has increased. Accordingly, in order to overcome the limitation of sound quality on an existing FM broadcast, digital audio broadcasting (DAB) has been implemented in European countries, Canada, United States or other countries. The DAB system provides an excellent receiving ability upon movement as well as a high quality sound using a technology different from existing AM or FM broadcasting and has a property of transmitting digital data such as image or text at a high speed. Recently, various multimedia services including image in addition to the audio broadcasting have been emphasized, which is referred to a digital multimedia broadcasting (DMB).

When the mobile terminal contains a DMB receiver or a DMB reception pack, it is possible to decode and display a moving picture encoded in the MPEG-4 standard in the mobile terminal. Accordingly, a user can be provided with various multimedia services through a mobile phone or a personal digital assistant (PDA). Here, the MPEG-4 was developed for the purpose of reception on movement to guarantee a reception of a good quality of program in fixed and mobile reception environments and to perform a role as media to provide a personal mobile broadcasting service since the program can be transferred through the mobile terminal (for example, on board unit, mobile phone and PDA).

In the MPEG-4 scheme, image signals are encoded on the basis of contents of the image, other than a conversion encoding scheme in a unit of block which is used in the H.261 standard, JPEG standard, and MPEG-1 and MPEG-2 standards. That is, in the MPEG-4 scheme, an image expression scheme based on the contents is employed and video objects each having attributes of screen shape information, movement information, and texture information are separated and processed. The image expression scheme based on the contents establishes an interrelation among the objects in a variety of multimedia applications and makes accesses and manipulations of them easy. That is, an object-oriented interactive function in the MPEG-4 deals with object elements of the screen and sound independently in the multimedia data access and couples them with one another using a link so that the user can freely construct the screen or sound. For example, while it was formerly possible to perform a process to change an actor's image while keeping the scenes on the screen, for example, only in the production step, the process can be performed in the user's step in the MPEG-4.

In the national standardization tasks for the DMB service, multimedia data in the sender is compressed and encoded in the MPEG-4 system taking consideration of the expandability of a variety of data services and transmitted to the MPEG-2 system together with meta-information. The MPEG-2 system packets the incoming MPEG-4 data in a packetized elementary stream (PES) format, makes it in a MPEG-2 transport stream (TS) format and transmits it using a Eureka system (the Eureka-147). Here, the Eureka system employs an orthogonal frequency division multiplexing (OFDM) transmission scheme together with time/frequency interleaving and error correction encoding in order to overcome a fading distortion caused by a transmission channel.

FIG. 1 is a view showing a construction of a DMB frame. Generally, a DMB frame transmission scheme includes a stream scheme and a packet scheme, and national ground wave DMB employs the stream scheme. Referring to FIG. 1, a symbol null is used to notify a start of a frame, and fast information channels (FICs) 10 have information on a sub-channel of common interleaved frames (CIFs) 20. Each CIF 20 includes maximum 64 sub-channels SCH0-SCH63 and each of the sub-channel SCH0-SCH63 includes an audio part (MPEG-1 Layer-II) and data part. The data part is divided into general data and a TS packet. The TS packet is a transmission format used to transmit the MPEG-2 stream, which includes the MPEG-4 stream in the TS packet in the case of the ground wave DMB.

FIG. 2 is a view showing a construction of a TS packet. Referring to FIG. 2, the length of the TS packet is 188 bytes, and the first 1 byte of the packet represents a starting point of the packet which starts with 0x47. Remaining 187 bytes are a portion where data is actually stored.

FIG. 3 is a block diagram showing an example of a transmitter of a general digital broadcasting system. Referring to FIG. 3, the transmitter of the digital broadcasting system generally includes a scrambler 310, a forward error correction (FEC) unit 330, and a modulator 340. The FEC unit 330 includes a Reed-Solomon (RS) encoder 312, an external interleaver 314, a converter 316, a convolution encoder 318, and an internal interleaver 320.

The scrambler 310 changes and randomizes each byte value of the TS packet of the incoming MPEG-2 format in a predetermined pattern.

The FEC unit 320 performs an encoding operation in order to correct errors that may occur while transmitting the TS packet data of 188 bytes input through the scrambler 310. The RS encoder (Reed-Solomon encoder) 312 receives the TS packet data output from the scrambler 310 and performs the RS encoding operation in a block to correct the error. A parity code to correct the error is added by the RS encoding operation. By doing so, the RS encoded TS packet data becomes 204 bytes. The external interleaver 314 rearranges the data encoded in the block in the RS encoder 312 and performs a function of distributing a burst error that may occur. The converter 316 converts the 204 byte TS packet data rearranged by the external interleaver 314 from bytes to bits. The convolution encoder 318 convolutionally encodes output the bits, and the convolutionally encoded bits are rearranged in the internal interleaver 320 and output. Accordingly, the channel encoded data is output.

The modulator 340 properly modulates the encoded data output from the FEC unit 330 according to a transmission scheme of a digital broadcasting system and transmits the DMB stream to the receiver.

The bits of the TS packet in the DMB stream are transmitted in a sub-channel, where a size of the sub-channel and a size of the TS packet are not synchronized. It is because while the size of the sub-channel is at least 64 bits, the size of the TS packet is 204*8 bits, so that a TS packet to sub-channel ratio equals about 25.5 which is not an integer when dividing 204*8 bits by 64 bits.

Accordingly, since the size of the sub-channel and the size of the TS packet are not synchronized, the starting points of the sub-channel and the starting point of the TS packet may not be coincidence with each other. That is, the TS packet can start in a middle portion of the sub-channel.

FIG. 4 is a block diagram showing an example of a receiver of a digital broadcasting system. Referring to FIG. 4, the receiver 400 of the digital broadcasting system includes a demodulator 410, an FEC unit 430 and a descrambler 440. The demodulator 410 demodulates the DMB stream received via an antenna. The FEC unit 430 corrects an error in a signal output from the demodulator 410, and decodes encoded data. The descrambler 440 descrambles data output from the FEC unit 430 and outputs the DMB stream including the TS packet.

Hereinafter, the FEC unit 430 will be described in a greater detail.

An internal deinterleaver 412 of the FEC unit 430 performs an internal deinterleaving operation corresponding to an interleaving operation performed by an internal interleaver of the sender. That is, the internal deinterleaver 412 performs an inverse operation of the internal interleaver of the sender. The signal deinterleaved by the internal deinterleaver 412 is transferred to the internal decoder 414, and then an internal decoding operation, corresponding to an encoding operation performed in the internal encoder of the sender is performed.

The signal decoded in the internal decoder 414 is converted from bits to bytes by the converter 416. The TS packet detector 418 detects the synchronized TS packet from the signal decoded by the byte. The synchronized TS packet is transferred to the external deinterleaver 420, where an external deinterleaving operation corresponding to an interleaving operation which is performed by the external interleaver of the sender is performed.

FIG. 5 is a view explaining a method for detecting a TS packet by a TS packet detector. Referring to FIG. 5, the TS packet detector 418 checks the TS packet byte by byte and then detects a synchronized byte '0x47'. When the synchronized byte '0x47' is detected for the first time, the packet detector 418 checks whether the synchronized byte '0x47' is detected every 188 bytes for three consecutive times. As a result, if the synchronized byte '0x47' is consecutively detected three times, it is determined that the TS packet is detected.

In the case that the TS packet is initialized in the transmitter of the digital broadcasting system or contents of the TS packet are changed, a starting point of the TS packet existing in the sub-channel (SCH0-SCH63) of the CIF 20 may be changed.

In that case, the starting point of the TS packet is changed upon operation of the receiver, there is a problem that the receiver may lose a symbol synchronization by the byte due to a new starting point of the TS packet, and then the decoder cannot perform a normal decoding operation.

SUMMARY OF THE INVENTION

The present invention provides an apparatus and method for monitoring synchronization of a TS packet in real time, and synchronizing the TS packet again in the case that the TS packet is not synchronized; thereby allowing the normal decoding to be performed.

The present invention also provides a receiver of a digital broadcasting system including the apparatus for synchronizing a TS packet.

According to an aspect of the present invention, there is provided a TS packet synchronization method comprising deinterleaving and decoding a demodulated TS packet; converting the decoded TS packet from bits to bytes; detecting a synchronization point of time of the TS packet; deinterleaving and decoding TS packets continued after the synchronization point of time; and sensing in real time whether or not the decoded TS packets in a predetermined range among the TS packets continued after the synchronized point of time are changed in synchronization due to a change of starting position of the TS packets.

The method of the present invention may further comprise detecting a synchronization point of time of the TS packet by repeatedly performing the detecting of the synchronization point of time of the TS packet when the synchronization of the TS packets in a predetermined range among the TS packets continued after the synchronization point of time is changed.

It may be determined that the synchronization of the TS packets in a predetermined range was changed when a synchronization byte of continuous TS packets having a predetermined number is not '0x47'.

The starting position of the TS packets may be changed when the TS packet is initialized or contents of the TS packet are changed.

The detecting of the synchronization point of time of the TS packet may comprise detecting the synchronization byte of '0x47'; checking whether the '0x47' is continuously detected every 188 bytes for a predetermined number of times after detecting the synchronization byte of '0x47'; and when the '0x47' is continuously detected for a predetermined number of times as a result of the checking operation, determining that the TS packet was synchronized and detecting the latest detected position of the byte '0x47' as a synchronization point of time of the TS packet.

The predetermined number may be 3.

According to another aspect of the present invention, there is provided a TS packet synchronization apparatus comprising an internal deinterleaver and an internal decoder for deinterleaving and decoding, respectively, a demodulated TS packet; a converter for converting the decoded TS packet from bits to bytes; a TS packet detector for detecting a synchronization point of time of the TS packet; an external deinterleaver and an external decoder for deinterleaving and decoding, respectively, TS packets continued after the synchronization point of time; and a TS packet synchronization detector for sensing in real time whether or not the decoded TS packets in a predetermined range among the TS packets continued after the synchronized point of time are changed in synchronization due to the change of starting position of the TS packets.

The TS packet synchronization sensor may transmit a desired control signal to the TS packet detector in order to redetect the synchronization point of time of the TS packet, when the synchronization of the TS packets in a predetermined range among the TS packets continued after the synchronization point of time is changed.

It may be determined that the synchronization of the TS packets in a predetermined range was changed when a synchronization byte of continuous TS packets having a predetermined number is not '0x47'.

The starting position of the TS packets may be changed when the TS packet is initialized or contents of the TS packet are changed.

According to yet another aspect of the present invention, there is provided a digital broadcasting system receiver, comprising a demodulator for demodulating TS packet bits received from an antenna; the TS packet synchronization apparatus; and a descrambler for descrambling and outputting data output from the packet synchronization apparatus as stated above.

BRIEF DESCRIPTION OF THE DRAWINGS

The above and/or other aspects of the present invention will be more apparent by describing exemplary embodiments of the present invention with reference to the accompanying drawings, in which.

DETAILED DESCRIPTION OF THE EXEMPLARY EMBODIMENTS

Hereinafter, the present invention will be described with reference to the accompanying drawings.

Figure 1:
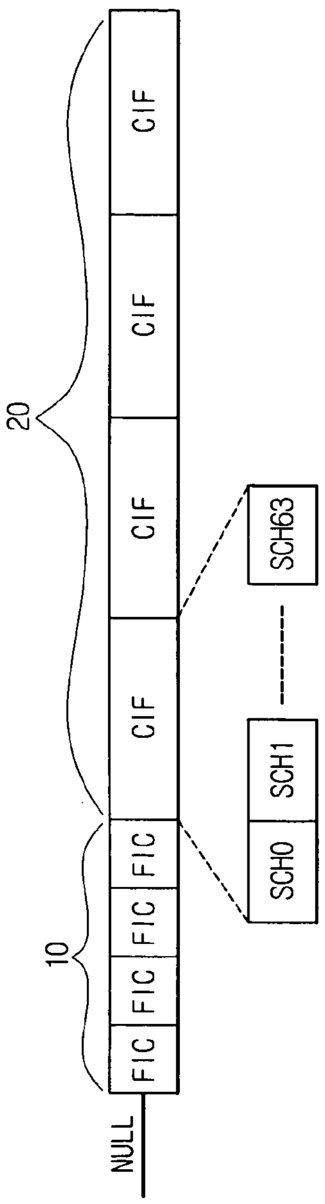
FIG. 1 (PRIOR ART)
FIG. 1 is a view showing a construction of a DMB frame.
Figure 2:
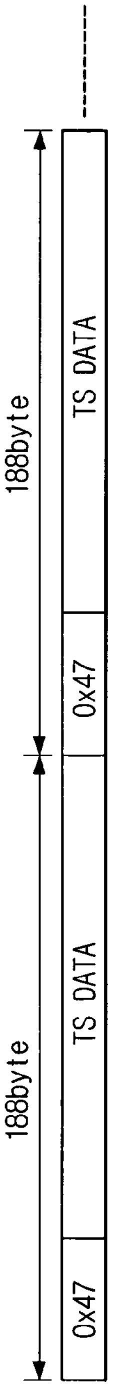
FIG. 2 (PRIOR ART)
FIG. 2 is a view showing a construction of a TS packet.
Figure 3:
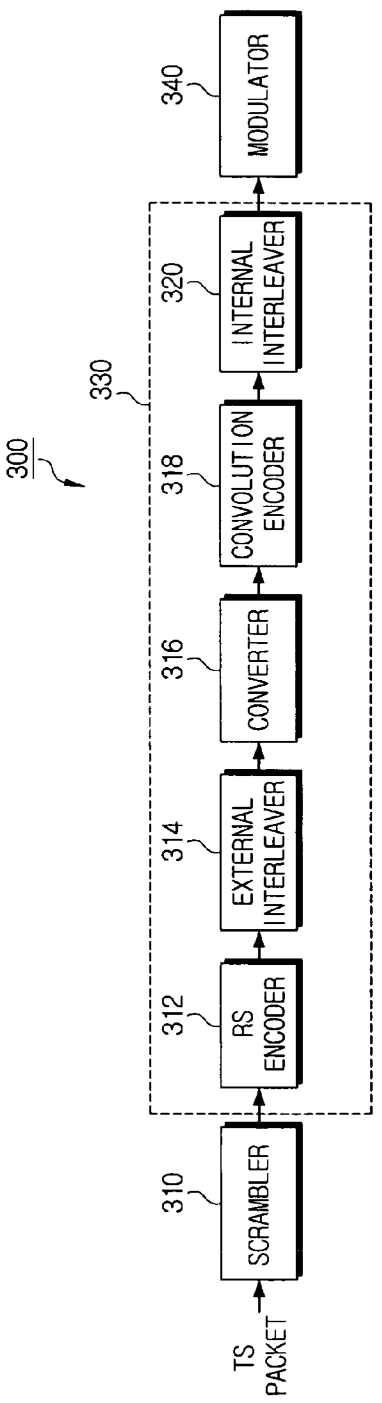
FIG. 3 (PRIOR ART)
FIG. 3 is a block diagram showing an example of a transmitter of a general digital broadcasting system.
Figure 4:
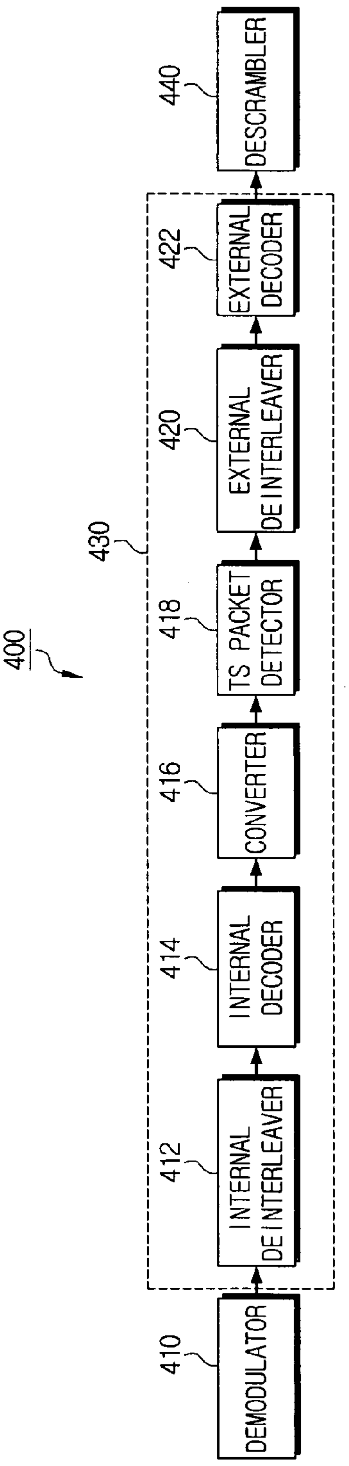
FIG. 4 (PRIOR ART)
FIG. 4 is a block diagram showing an example of a receiver of a digital broadcasting system.
Figure 5:
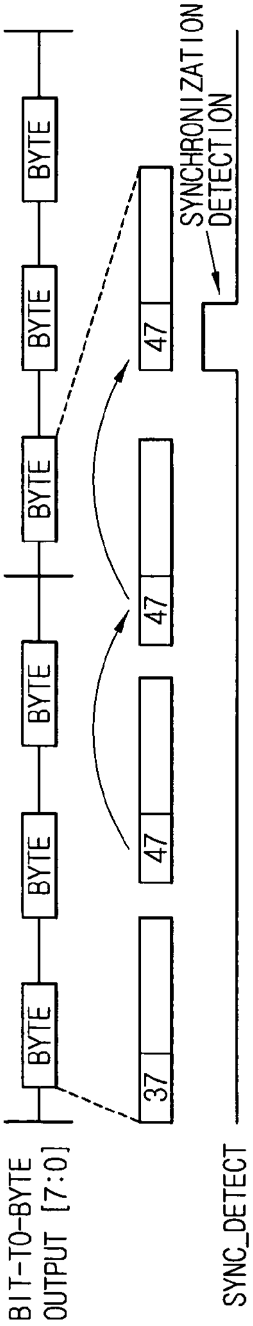
FIG. 5 (PRIOR ART)
FIG. 5 is a view explaining a method for detecting a TS packet in a TS packet detector.
Figure 6:
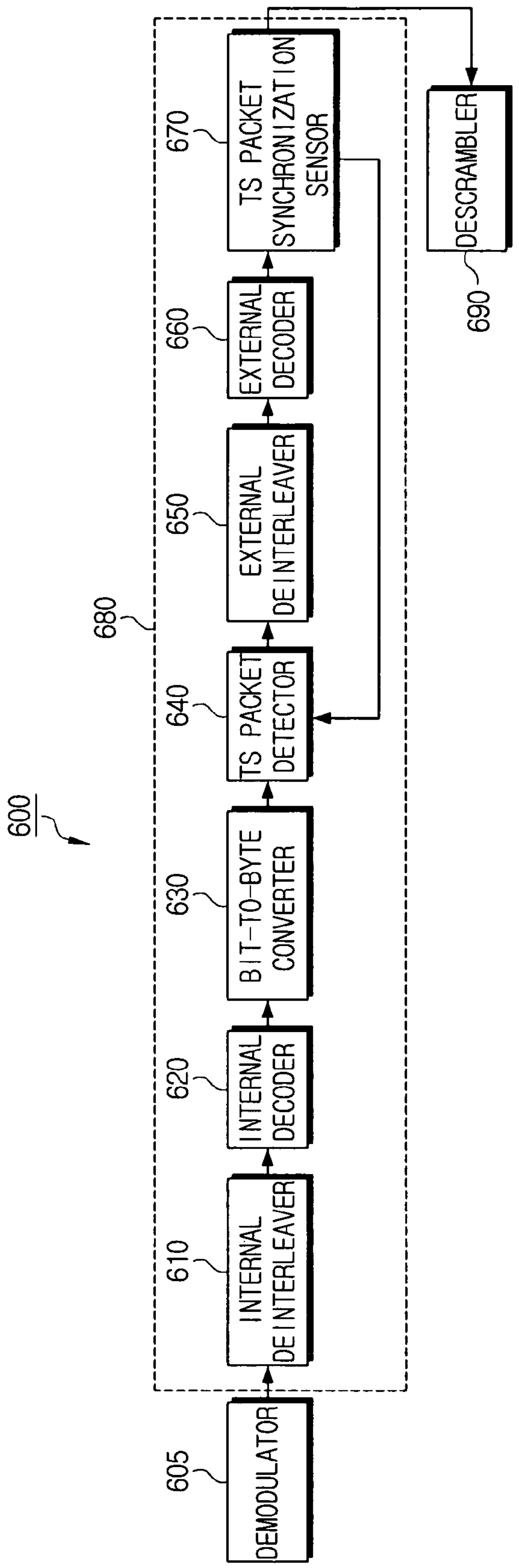
FIG. 6 is a block diagram of a receiver showing a construction of an apparatus for synchronizing a TS packet in accordance with an exemplary embodiment of the present invention.

FIG. 6 is a block diagram of a receiver 600 showing a construction of a TS packet synchronization apparatus 680 in accordance with an exemplary embodiment of the present invention.

The TS packet synchronization apparatus 680 may include an internal deinterleaver 610, an internal decoder 620, a converter 630, a TS packet detector 640, an external deinterleaver 650, an external decoder 660 and a TS packet synchronization sensor 670.

A demodulator 605 demodulates the TS packet bits received through an antenna. The internal deinterleaver 610 performs an deinterleaving operation of the TS packet input from the demodulator 605 by performing an inverse operation of the internal interleaver of a sender. The internal decoder 620 performs an internal decoding corresponding to an encoding operation performed in the internal encoder of the sender, that is, a decoding operation.

The converter 630 converts the TS packet bits decoded in the internal decoder 620 into TS packet bytes.

The TS packet detector 640 detects a synchronized TS packet from the input TS packet.

The external deinterleaver 650 performs an external deinterleaving operation corresponding to the interleaving operation performed by the external interleaver of the sender. The external decoder 660 performs an RS decoding operation for the TS packets in which the external decoding operation has been performed.

The TS packet synchronization sensor 670 senses whether the TS packet in which the RS decoding operation is performed and which is sequentially input is synchronized in real time. As a result of the sensing, in the case that the synchronization of the TS packet was not performed, a signal 'Sync_Fail_Flag' is transmitted to the TS packet detector 640 so that the TS packet detector 640 is informed that a desired TS packet was not synchronized. As a result of the sensing, in the case that the synchronization of the TS packet was performed, the TS packet synchronization sensor 670 outputs the TS packets whose RS decoding operation were performed in the external decoder 660 to the descrambler 690.

The descrambler 690 descrambles data output from the TS packet synchronization sensor 670 and outputs a DMB stream including the TS packet.

Figure 7:
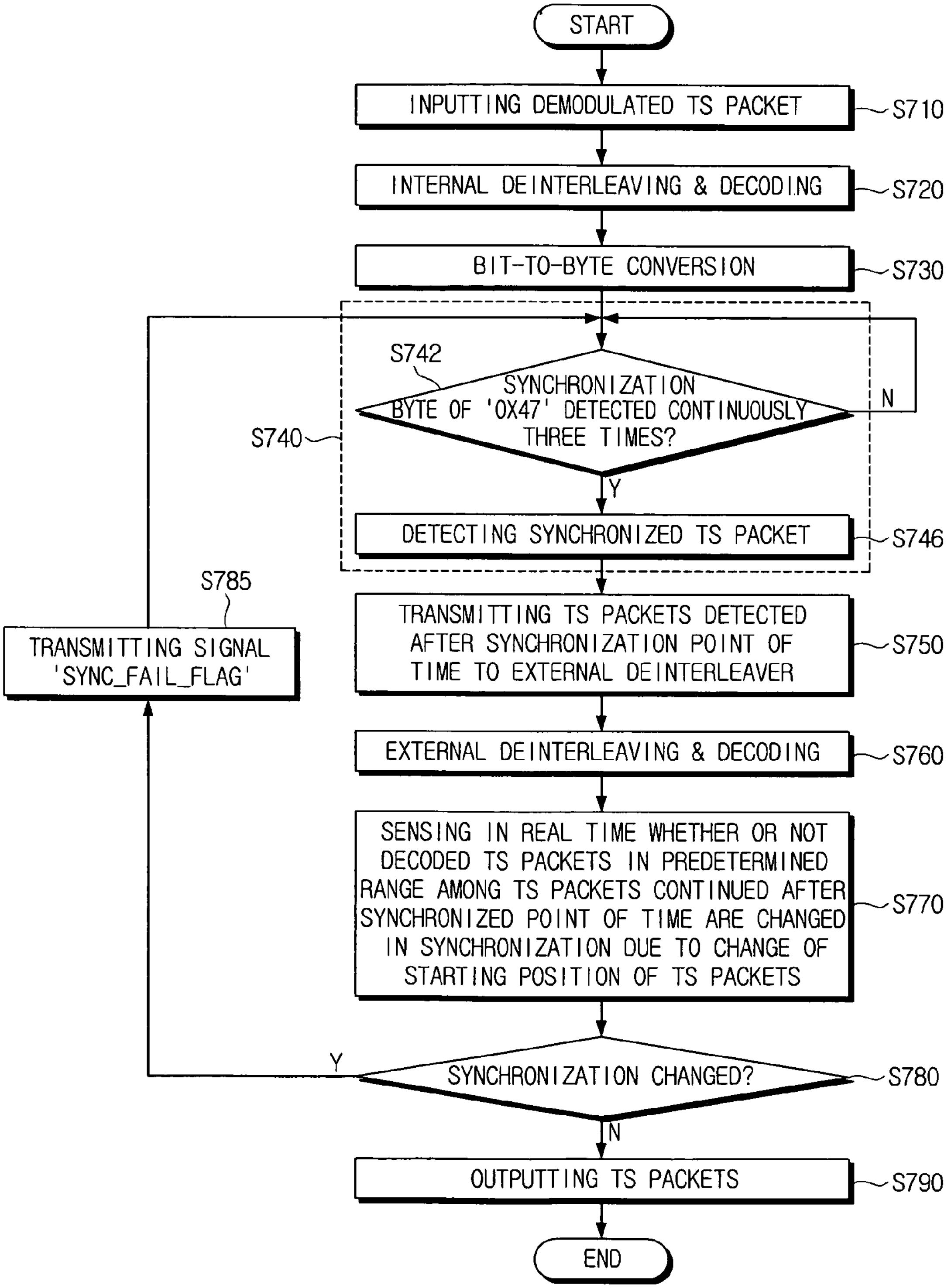
FIG. 7 is a flow chart explaining a method for synchronizing a TS packet in accordance with an exemplary embodiment of the present invention.

FIG. 7 is a flow chart explaining a method for synchronizing a TS packet in accordance with an exemplary embodiment of the present invention. Referring to FIG. 7, the TS packet decoded in the decoder 605 is input to the internal deinterleaver 610 and internal decoder 620 (S710).

The internal deinterleaver 610 performs an inverse operation of the internal interleaver of the sender. The TS packet that was deinterleaved in the internal deinterleaver 610 is transmitted to the internal decoder 620, and internally decoded correspondingly to the encoding operation performed in the internal encoder of the sender, that is, decoded. That is, the demodulated TS packet is deinterleaved and decoded in the internal deinterleaver 610 and the internal decoder 620, respectively (S720).

The TS packet bits that were decoded in the internal decoder 620 are converted from bits to bytes (S730).

The converted TS packet is input to the TS packet detector 640. The TS packet detector 640 detects the synchronized TS packet from the TS packet (S740).

Describing it in more detail, the TS packet detector 640 detects the synchronized byte of '0x47' by checking the TS packet bytes. When the synchronized byte of '0x47' is detected for the first time, the TS packet detector 640 checks whether the synchronized byte of '0x47' was continuously detected every 188 bytes for three times (S742). As a result of the check, when the synchronized byte of '0x47' was continuously detected three times (Y), it is determined that the synchronized TS packet was detected (S746). As such, when the synchronized TS packet is detected, the TS packet detector 640 transmits the TS packet detected after the synchronized point of time to the external deinterleaver 650 (S750).

Subsequently, the external deinterleaving operation and RS decoding operation will be performed with respect to the TS packets continued after the synchronized time (S760). Described in more detail, the TS packets converted after the synchronized point of time are transferred to the external deinterleaver 650 so that the external deinterleaving operation corresponding to the interleaving operation performed by the external interleaver of the sender is performed. The TS packets in which the external deinterleaving operation was performed are RS decoded by the external decoder 660.

Subsequently, the TS packet synchronization sensor 670 senses whether or not the TS packet that is RS decoded and input sequentially is synchronized in real time (S770). Described in greater detail, the TS packet synchronization sensor 670 senses in real time whether or not the decoded TS packets in a predetermined range among the TS packets continued after the synchronized point of time are changed in synchronization due to the change of starting position of the TS packets.

In order to sense whether the synchronizations are changed, the TS packet synchronization sensor 670 checks whether the synchronization byte of N continuous input TS packets is '0x47'. The N may be identical to 3 in an exemplary embodiment of the present invention.

In the case that the synchronization byte of the N continuous TS packets is not '0x47', that is, the TS packets in a predetermined range are changed in synchronization (S780: Y), the TS packet synchronization sensor 670 transmits a signal 'Sync_Fail_Flag' to the TS packet detector 640 (S785). When the signal 'Sync_Fail_Flag' is transmitted to the TS packet detector 640, the TS packet detector 640 recognizes that the desired TS packet was not synchronized.

That is, when the signal 'Sync_Fail_Flag' is input from the TS packet synchronization sensor 670, the TS packet detector 640 detects the synchronized TS packet by performing the above described TS packet detection. In the case that the TS packet is not synchronized, since the resynchronization for the TS packet is performed, it is possible to perform a normal decoding operation.

In the case that the synchronization byte of the N continuous TS packets is '0x47', that is, the continuous TS packets in a predetermined range are not changed (S780: N), the TS packet synchronization sensor 670 outputs the TS packets that are RS decoded in the internal decoder 660 to the descrambler 690.

As described above, according to exemplary embodiments of the present invention, it is sensed in real time whether or not the TS packets that were RS decoded by the external decoder are synchronized. And, when the TS packets are not synchronized, they are resynchronized and output so that a normal decoding operation can be performed. Accordingly, there is an advantage in that a normal decoding operation can be performed even when the synchronization is lost due to the change of the starting point of the TS packet.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A transport stream (TS) packet synchronization method comprising:

deinterleaving and decoding a demodulated TS packet;

converting the decoded TS packet from bits to bytes;

detecting a synchronization point of time of the converted TS packet;

deinterleaving and decoding TS packets after the synchronization point of time; and sensing in real time whether the decoded TS packets in a predetermined range among the TS packets after the synchronized point of time are changed in synchronization due to a change of starting position of the TS packets.

2. The method as claimed in claim 1, further comprising re-detecting a synchronization point of time of the converted TS packet by repeatedly performing the detecting the synchronization point in time of the converted TS packet if the synchronization of the TS packets in a predetermined range among the TS packets continued after the synchronization point of time is changed, as a result of the sensing.

3. The method as claimed in claim 1, wherein it is determined that the synchronization of the TS packets in a predetermined range was changed if a synchronization byte of continuous TS packets having a predetermined number is not '0x47'.

4. The method as claimed in claim 1, wherein the starting position of the TS packets is changed if the TS packet is initialized or contents of the TS packet are changed.

5. The method as claimed in claim 1, wherein the detecting the synchronization point in time of the converted TS packet if comprises:

detecting the synchronization byte of '0x47';

checking whether the '0x47' is continuously detected every 188 bytes for a predetermined number of times after detecting the synchronization byte of '0x47'; and if the '0x47' is continuously detected for a predetermined number of times, determining that the TS packet was synchronized and detecting the position of the byte '0x47' detected latest as a synchronization point of time of the TS packet.

6. The method as claimed in claim 5, wherein the predetermined number is 3.

7. A transport stream (TS) packet synchronization apparatus comprising:

an internal deinterleaver and an internal decoder which deinterleaves and decodes a demodulated TS packet, respectively;

a converter which converts the decoded TS packet from bits to bytes;

a TS packet detector which detects a synchronization point of time of the converted TS packet;

an external deinterleaver and an external decoder which deinterleaves and decodes TS packets after the synchronization point of time; and a TS packet synchronization detector which senses in real time whether the decoded TS packets in a predetermined range among the TS packets continued after the synchronized point of time are changed in synchronization due to a change of starting position of the TS packets.

8. The apparatus as claimed in claim 7, wherein the TS packet synchronization sensor transmits a desired control signal to the TS packet detector in order to redetect the synchronization point of time of the TS packet, if the synchronization of the TS packets in a predetermined range among the TS packets continued after the synchronization point of time is changed.

9. The apparatus as claimed in claim 7, wherein it is determined that the synchronization of the TS packets in a predetermined range was changed if a synchronization byte of continuous TS packets having a predetermined number is not '0x47'.

10. The apparatus as claimed in claim 7, wherein the starting position of the TS packets is changed if the TS packet is initialized or contents of the TS packet are changed.

11. A digital broadcasting system receiver comprising:

a demodulator for demodulating a transport stream (TS) packet received from an antenna;

a TS packet synchronization apparatus comprising:

an internal deinterleaver and an internal decoder which deinterleaves and decodes a demodulated TS packet, respectively;

a converter which converts the decoded TS packet from bits to bytes;

a TS packet detector which detects a synchronization point of time of the converted TS packet;

an external deinterleaver and an external decoder which deinterleaves and decodes TS packets after the synchronization point of time; and a TS packet synchronization detector which senses in real time whether the decoded TS packets in a predetermined range among the TS packets continued after the synchronized point of time are changed in synchronization due to a change of starting position of the TS packets; and a descrambler which descrambles and outputs data output from the packet synchronization apparatus.

12. The digital broadcasting system receiver as claimed in claim 11, wherein the TS packet synchronization sensor transmits a desired control signal to the TS packet detector in order to redetect the synchronization point of time of the TS packet, if the synchronization of the TS packets in a predetermined range among the TS packets continued after the synchronization point of time is changed.

13. The digital broadcasting system receiver as claimed in claim 11, wherein it is determined that the synchronization of the TS packets in a predetermined range was changed if a synchronization byte of continuous TS packets having a predetermined number is not '0x47'.

14. The digital broadcasting system receiver as claimed in claim 11, wherein the starting position of the TS packets is changed if the TS packet is initialized or contents of the TS packet are changed.

* * * * *